(12) United States Patent
Cumming et al.

(10) Patent No.: US 6,470,321 B1
(45) Date of Patent: Oct. 22, 2002

(54) SYSTEM, METHOD, AND COMPUTER PROGRAM PRODUCT FOR PROVIDING FINANCIAL PROTECTION OF EQUITY INVESTMENTS

(75) Inventors: David T. Cumming, Park City, UT (US); Janice Co, Lake Forest, IL (US)

(73) Assignee: Forthcoming LLP, Park City, UT (US)

( * ) Notice: Subject to any disclaimer, the term of this patent is extended or adjusted under 35 U.S.C. 154(b) by 0 days.

(21) Appl. No.: 09/628,949

(22) Filed: Jul. 28, 2000

Related U.S. Application Data
(60) Provisional application No. 60/197,683, filed on Apr. 17, 2000.

(51) Int. Cl.⁷ .............................................. G06F 17/00
(52) U.S. Cl. ............................................... 705/4; 705/1
(58) Field of Search ........................... 705/1, 4, 35, 36

(56) References Cited

U.S. PATENT DOCUMENTS

| | | | | |
|---|---|---|---|---|
| 4,831,526 A | * | 5/1989 | Luchs et al. .................... 705/4 |
| 5,680,305 A | | 10/1997 | Apgar, IV .............. 364/401 R |
| 5,704,045 A | * | 12/1997 | King et al. .................... 705/35 |
| 5,752,237 A | * | 5/1998 | Cherny .......................... 705/4 |
| 5,802,501 A | * | 9/1998 | Graff ........................... 705/36 |
| 5,806,049 A | | 9/1998 | Petruzzi ....................... 705/36 |
| 5,812,988 A | | 9/1998 | Sandretto ..................... 705/36 |
| 5,819,237 A | | 10/1998 | Garman ........................ 705/36 |
| 5,855,005 A | * | 12/1998 | Schuler et al. ................ 705/4 |
| 5,870,720 A | | 2/1999 | Chusid et al. ................ 705/38 |
| 5,873,066 A | * | 2/1999 | Underwood et al. ........... 705/4 |
| 5,983,204 A | | 11/1999 | Debe ............................ 705/36 |
| 6,003,018 A | | 12/1999 | Michaud et al. .............. 705/36 |
| 6,018,722 A | | 1/2000 | Ray et al. ..................... 705/36 |
| 6,049,772 A | | 4/2000 | Payne et al. .................... 704/4 |
| 6,055,517 A | | 4/2000 | Friend et al. ................. 705/36 |
| 6,058,377 A | | 5/2000 | Traub et al. .................. 705/36 |
| 6,061,662 A | | 5/2000 | Makivic ........................ 705/36 |
| 6,064,985 A | | 5/2000 | Anderson ..................... 705/36 |
| 6,078,904 A | | 6/2000 | Rebane ......................... 705/36 |
| 6,085,175 A | | 7/2000 | Gugel et al. .................. 705/36 |
| 6,088,685 A | | 7/2000 | Kiron et al. .................. 705/36 |

FOREIGN PATENT DOCUMENTS

| WO | WO 00/75821 | * 12/2000 |
|---|---|---|

OTHER PUBLICATIONS

Meyers, Glenn. "A Buyer's Guide for Options and Futures on a Catastrophe Index," Proceedings of the Casualty Actuarial Society. vol. LXXXV. May 1998. pp. 273–296.*

Corporations, from http://www.yourpersonalcpa.com/entity/corporation.htm web page downloaded on Mar. 12, 2001.*

Primoff, Walter M. "LLCs: The Business Planner's Dream Entity" web page from http://www.nysscpa.org/cpajournal/old/17285140.htm downloaded on Mar. 12, 2001.*

Patterson, Gerald, "A Limited Liability Company: A New Hybrid Entity Form," Broker World. Apr. 1995. p. 58.*

* cited by examiner

*Primary Examiner*—Sam Rimell
(74) *Attorney, Agent, or Firm*—Sterne, Kessler, Goldstein & Fox P.L.L.C.

(57) ABSTRACT

A system and method for determining an equity protection insurance policy (EPIC) for investors or shareholders to protect their equity investment in a business entity based on the happening of a fortuitous event is disclosed. The EPIC is in the form of an insurance policy or a put option, in which the shareholder pays lower premiums for the option to sell the equity interest in the entity to the issuer (e.g., carrier) of the EPIC upon the happening of a fortuitous event, such as an E&O claim. Alternatively, rather than receiving an indemnity payment or a purchase of the investment as protection, the present invention also can be formulated as a letter of credit. In this embodiment, the shareholder pays a very low premium in exchange for a letter of credit promising to lend the investor a predetermined amount that is calculated to be sufficient to re-establish an investor's business or start over in the same or similar line of work.

19 Claims, 4 Drawing Sheets

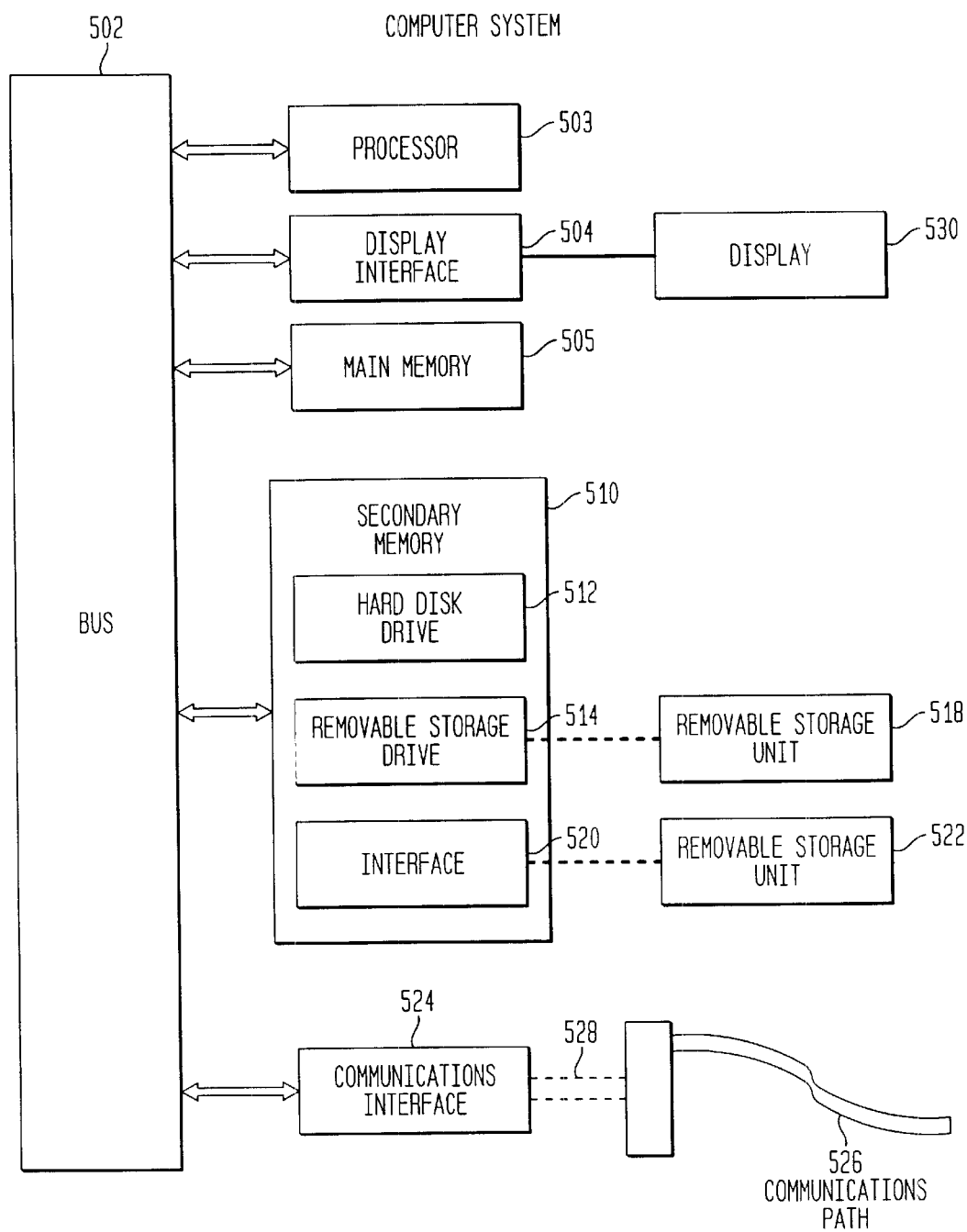

SYSTEM, METHOD, AND COMPUTER PROGRAM PRODUCT FOR PROVIDING FINANCIAL PROTECTION OF EQUITY INVESTMENTS

CROSS-REFERENCE TO RELATED APPLICATION

This patent application claims priority to co-pending United States provisional patent application entitled, "System, Method, and Computer Program Product for Providing Financial Protection of Equity Investments," Ser. No. 60/197,683, filed Apr. 17, 2000, and incorporated herein by reference.

BACKGROUND OF THE INVENTION

1. Field of the Invention

The present invention relates generally to general corporate insurance systems and more particularly to the processing, valuation, and charging for financial instruments to protect equity investments.

2. Related Art

The liability system in the courts of the United States and many other industrialized countries has all but gone out of control from the point of view of insurance companies. The perceived problem is that most kinds of liability problems have turned into the something resembling a lottery. Judgments are on the rise and forum shopping by plaintiffs is becoming more aggressive.

The basic structure of corporate liability insurance is to place a barrier out in front of the corporation that is so large that no liability can pierce it or get around it and affect the corporation. The difficulty with this approach is (1) when the protection is defined by the potential size of the exposure, it creates a target that is worth more effort to pursue by plaintiffs, and (2) the cost of protection is dictated by the size of the largest possible risk rather than by the size of the asset bing protected.

Many assets of the corporation are generally impractical or impossible to attach by a judgment. For example, the main assets of a limited liability law firm are know-how and a customer list. In the case of a one hundred million dollar judgment against that firm, the plaintiff will never get the value of the company's knowledge of the law, client base or goodwill. The judgment will realize only the liquidation value of the firm (e.g., the sale of its tangible assets).

In order to protect against certain liabilities (e.g., E&O, or errors and omissions liability), many companies forecast the largest plausible amount any plaintiff might sue them for, and then buy an insurance policy for that amount. By doing so, the company creates a situation in which it makes economic sense for a plaintiff law firm to invest more of its own time and effort in an attempt to win a judgment against the company and its insurance carrier(s). The firm creates a deep pocket. The deeper the pocket becomes, the more attractive it is for plaintiff's attorneys to put forth the effort to reach into that pocket on a contingency fee basis. The insured, by acting in this manner forgoes most of the protection provided by (1) doing business in a corporate form, (2) limitations on the execution of judgements, and (3) debt protection provisions in insolvency and other statutes.

Some existing systems address part of the problem by insuring against vicarious liability. For instance, a system exists for protecting the equity investment of a venture capital (VC) firm. The system helps VC firms to deal with the possibility that vicarious or participatory liability is alleged when a firm it has invested in is sued. This system of providing coverage against liability for the venture capital firm, the directors and partners all in the same policy. In that sense, it addresses one of the above concerns, namely it protects the wealth of the investor in the entity. However, because it is all one policy and paid for and owned by the VC firm, in the event of a large loss, the policy's limits are exhausted by the VC firm's liability and the partners of the firm are left with nothing. More specifically, this VC protection system is a policy that belongs to the entity against which liability is sought. The policy is paid for by the entity against which liability is sought. And like all liability policies, it relies on size alone for completeness of protection, rather than on the nature of its assets, restrictions on executions of judgment and bankruptcy.

What is needed is a system of protection the is separate from the system that protects the entity and provides coverage for the investments of equity owners of the entity.

SUMMARY OF THE INVENTION

The present invention is directed to a system, computer program product and business method for providing an investor with financial protection against a loss in value in an investment in a limited liability entity arising from an event against which the entity is inadequately insured or has no insurance.

One embodiment of the present invention comprises the steps of determining the amount of primary insurance that the entity has and the scope of its coverage. This amount drives the basis for the additional financial protection of the equity (i.e., the investor or shareholder's value in the investment). The next steps can include determining the amount of working capital required to reestablish the entity, determining the investor's basis in the investment, and determining the free cash flow of the entity. A maximum level of coverage can then be determined based on the working capital amount, the basis, or the free cash flow amount. Then a premium charge can be determined for a desired insurance amount in excess of the primary insurance. The desired insurance amount is equal to or less than the maximum level of coverage for the relevant risk classification.

In another embodiment, the present invention provides an investor with financial protection against a loss in value in an investment in a limited liability entity arising from an event against which the entity has not obtained insurance. This embodiment involves determining the amount of working capital required to reestablish the entity, or determining the investor's basis in the investment, as well as determining the free cash flow of the entity. The marked-to-market tangible net worth of the entity is also determined. Based on this data a maximum level of coverage can be determined. Then a premium charge for a desired amount of insurance is computed. The desired amount is equal to or less than the smaller of the amount of working cap, the basis, or the maximum level of coverage for the relevant risk classification.

In a further embodiment, the present invention provides an investor with financial protection against a loss in value in an investment in a limited liability entity arising from events against which the entity is inadequately insured, and/or events against which the entity has not obtained insurance. As in the first embodiment, this further embodiment includes determining the amount of primary insurance that the entity has, the scope of its coverage and its limits. The working cap required to reestablish the entity, the investor's basis in the investment, the risk classification of the entity, the marked-to-market tangible net worth of the entity, and the free cash flow of the entity are also determined. The maximum level of coverage can then be determined using various combinations of this data. For risks in which there is primary insurance, a first premium charge in excess of the primary insurance for the relevant risk classification can be determined based on an amount equal to or less than a smaller of the working capital, the basis, and the maximum level of coverage. On risks for which there is no insurance, a second premium charge can be determined for insurance in an amount equal to or less than a smaller of the working capital, the basis, and the maximum level of coverage.

In a still further embodiment, the present invention provides an investor with financial protection against a loss in value in an investment in a limited liability entity arising from an event against which the entity is inadequately insured. As in the first embodiment, this still further embodiment includes determining the amount of primary insurance that the entity has, the scope of its coverage and its limits. The working cap required to reestablish the entity, the investor's basis in the investment, the risk classification of the entity, the marked-to-market tangible net worth of the entity, and the free cash flow of the entity are determined. The maximum level of coverage can be determined using various combinations of this data. According to this embodiment, an amount (D) equal to or less than the smaller of the working cap, the basis, and the maximum level of coverage can be determined. Finally, consideration for an option to put the investor's equity in the investment for the amount D is determined by computing an amount for risks in excess of the primary insurance for the relevant risk classification, and an amount for risks for which there is no insurance.

Further features and advantages of the present invention, as well as the structure and operation of various embodiments of the present invention, are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 5 is a block diagram of an exemplary computer system useful for implementing the present invention.

DETAILED DESCRIPTION OF THE PREFERRED EMBODIMENTS

I. Introduction

Figure 1:
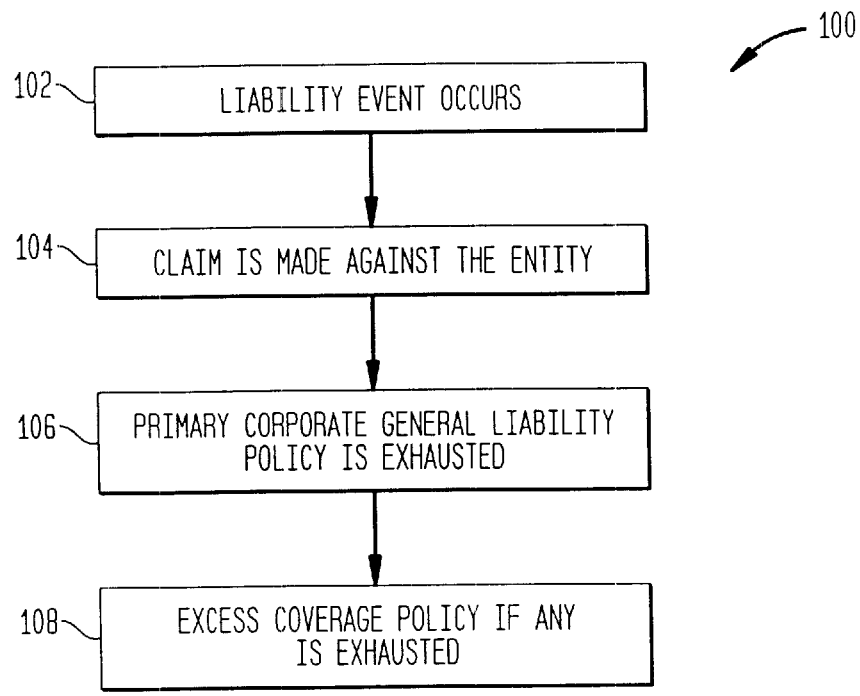
FIG. 1 is a high level flowchart representing conventional excess insurance coverage.

From the point of view of a shareholder of a corporation that has tangible assets and intangible assets, the motivation to buy insurance is to preserve cash flow and protect capital. In other words, the shareholder wants to receive a return that may be in the form of dividends, appreciation, salary, bonus, or the like, depending on the nature of the entity in which the invention is made. The present invention is a method, system and computer program product to provide shareholders (i.e., someone that owns an equity interest in any full or limited liability corporation) with protection for their investment.

In limited liability corporations (i.e., any ownership mechanism that has limited liability preventing personal liability of an owner), such as a standard corporation, a law firm, accounting firms, the individual owners want to guarantee the cash stream that comes to them for their efforts does not become materially interrupted. In contrast, an investor in a public company frequently is more interested in appreciation than current income. The present invention, rather than scaling insurance to the largest imaginable claim, permits the individual equity owners to insure their own interests. In effect, if a business is destroyed and all the tangible assets are lost, what is essential to individual equity owners is (1) in the case of small corporations, sufficient capital to reestablish the business by purchasing the necessary furniture and equipment to open at another location, and (2) in the case of large corporations, a return of the lost capital of the investor. Thus, the amount of coverage needed is defined by the amount of the loss to the individual investor, not by the size of the claim. This takes into account the limited nature of the investment made and the fact that the fundamental value of most businesses is in intangible assets. For example, the fundamental value of a law firm is the minds of lawyers (e.g., their knowledge of the law, client contacts, business sense, etc.). Thus, an entity who's main asset is not attachable should not create an E&O policy to cover some fictitious amount that a plaintiff may seek. Such excess amount merely attracts an inflated claim.

II. Overview

In an embodiment of the present invention an equity protection insurance policy (EPIC) is provided to investors or shareholders to protect their equity investment in a business entity based on the happening of a fortuitous event. The details of how EPIC premiums are determined according to the system and method of the present invention are described in detail below in connection with FIGS. 2–4.

In another embodiment of the present invention the EPIC is in the form of a put option, in which the shareholder pays lower premiums for the option to sell the equity interest in the entity to the issuer (e.g., carrier) of the EPIC upon the happening of a fortuitous event, such as an E&O claim.

Alternatively, rather than receiving an indemnity payment or a purchase of the investment as protection, the present invention also can be formulated as a letter of credit. In this embodiment, the shareholder pays a very low premium in exchange for a letter of credit promising to lend the investor a predetermined amount that is calculated to be sufficient to re-establish an investor's business or start over in the same or similar line of work.

The present invention is described in terms of the above examples. This is for convenience only and is not intended to limit the application of the present invention. For example, and as would become apparent to one skilled in the relevant art, the ordering of steps of the claimed invention can be varied depending on the calculus required to determine a premium for a desired amount of insurance. In fact, after reading the following description, it will be apparent to one skilled in the relevant art how to implement the following invention in alternative embodiments.

III. System Architecture

Referring to FIG. 1, a flowchart 100 represents the operation of standard general liability insurance policies. Flowchart 100 begins with a step 102, which represents the occurrence of a liability event. At a step 104, a claim is made against the corporate entity. Based on the claim, the primary corporate general liability policy is exhausted, as shown at a step 106. Moreover, if an excess coverage insurance policy exists, it too can be applied to cover the E&O claim, as shown generally at step 108. Under these circumstances, however, the shareholders (e.g., partners, owners, or the like) have no protection for their individual equity.

Figure 2:
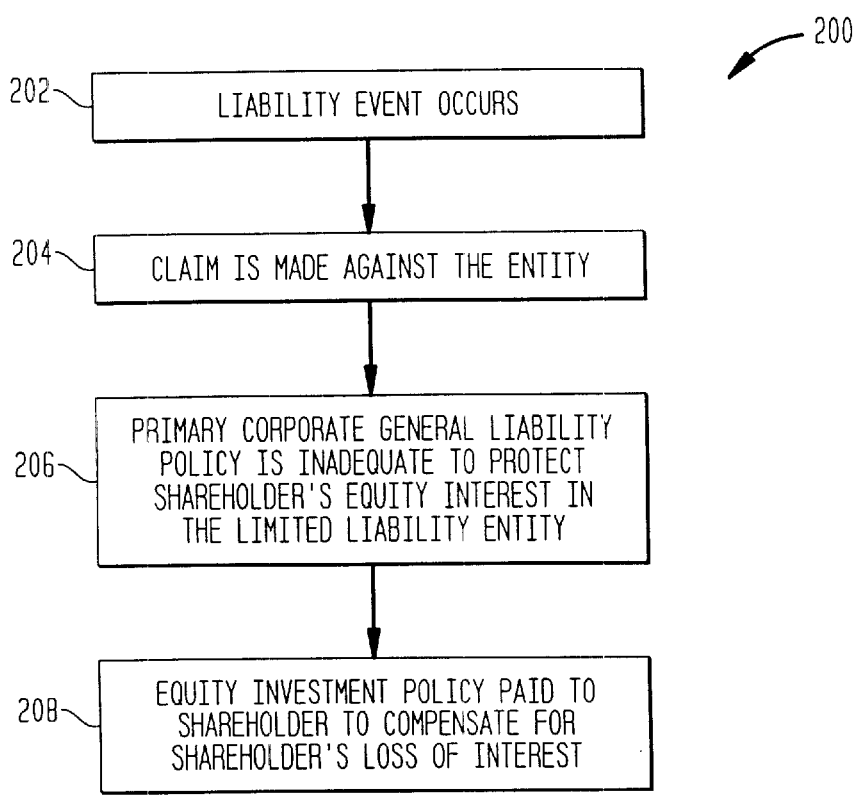
FIG. 2 is a high level flowchart representing a preferred operation of the present invention.

Referring to FIG. 2, a flowchart 200 representing the operation of an equity protection insurance contract (EPIC) method, according to an embodiment of the present invention, is shown. A step 202 represents the occurrence of a liability. A step 204 represents the filing of an E&O claim against the entity. A step 206 represents the primary corporate general liability (CGL) policy being applied against the claim, but is inadequate to protect the shareholders' equity interests in the limited liability entity. According to the present invention, at step 208, an EPIC policy is paid to the shareholders to compensate for their equity losses.

Figure 3:
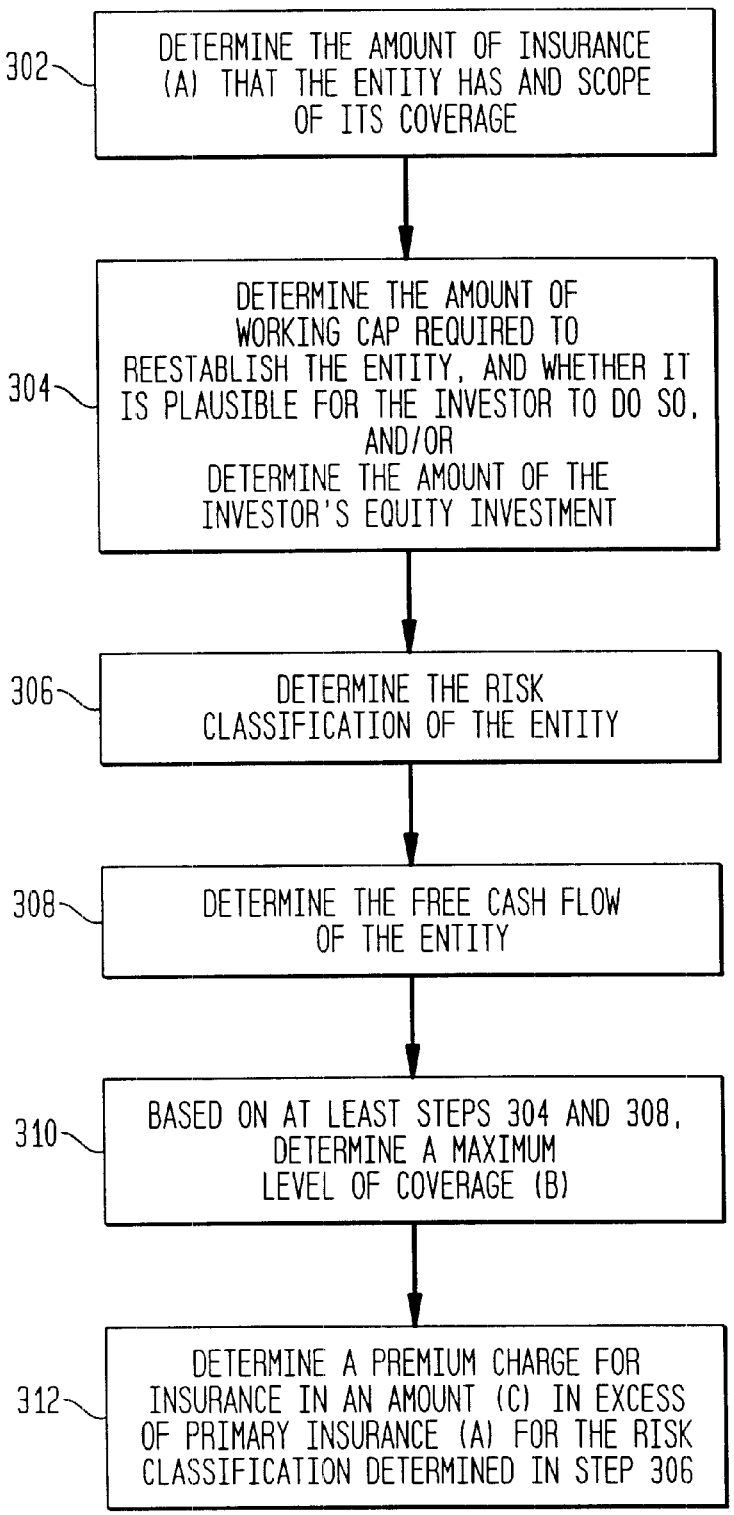
FIG. 3 is a flowchart representing a preferred operation of the present invention.

A method for providing an investor or shareholder with financial protection against a loss in value in an investment in a limited liability entity arising from an event against which the entity is inadequately insured is illustrated in FIG. 3.

A flowchart 300 representing the a more detailed operation the EPIC method, according to the present invention. The first step, as shown at a 302, is to determine the amount of insurance (A) that the entity has and the scope of its coverage. Next step, 304, is to determine the amount of working capital required to reestablish the entity and whether it is plausible for the investor to do so, or in the alternative, determine the amount of the investor's equity investment. At a step 306, the risk classification of the entity is determined. Next, at a step 308, a free cash flow at the rate of the entity is determined. At a step 310, the maximum level of coverage (B) is determined based on at least steps 304 and 308 (the working capital and free cash flow determinations). Finally, at a step 312, a premium charge for insurance in an amount (C) in excess of the primary insurance (A) for the risk classification determined in step 306 is determined. The method of FIG. 3 will be further described in connection with below description of a system according to the present invention as shown in FIG. 4.

Figure 4:
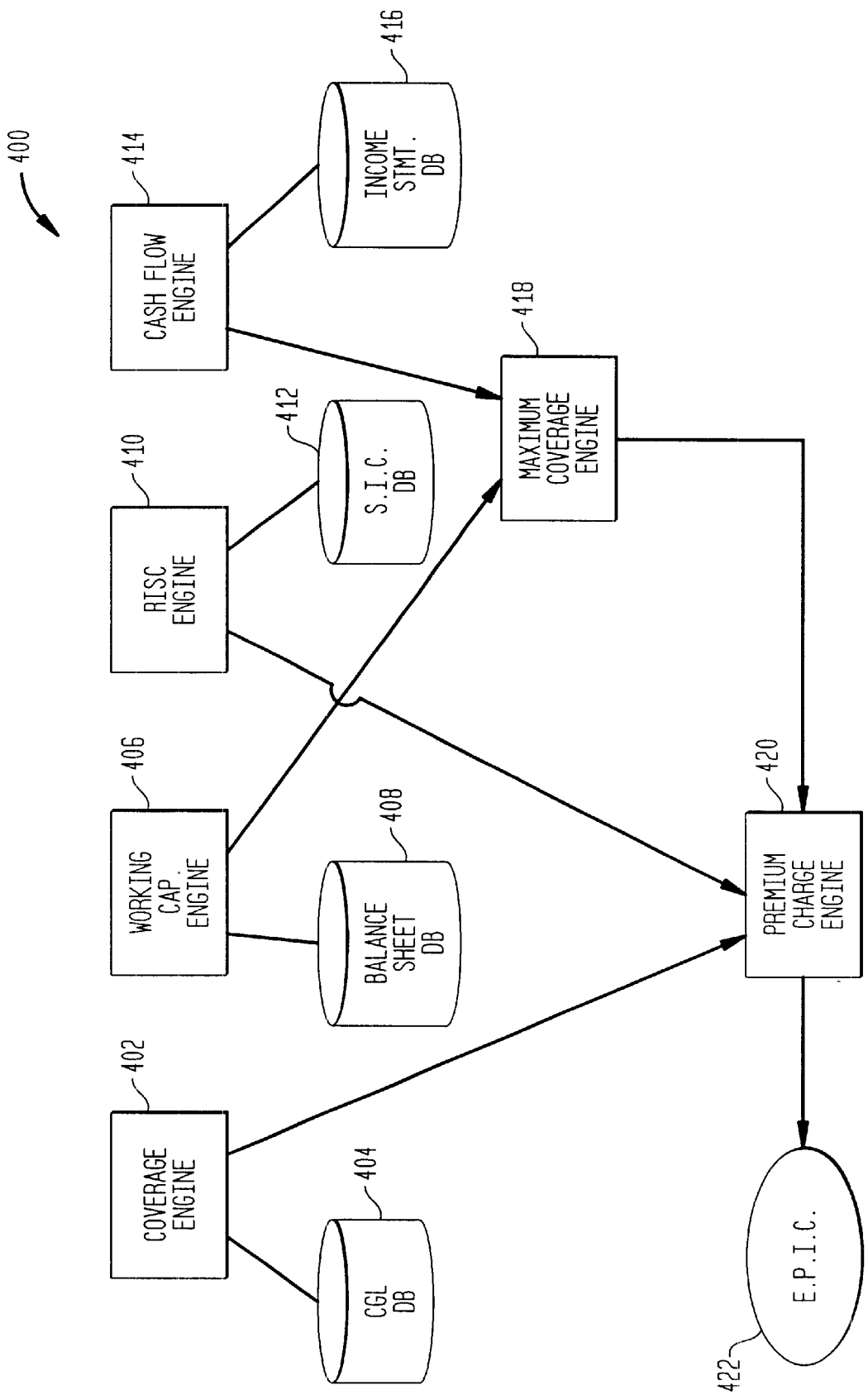
FIG. 4 is a block diagram representing the system architecture of an embodiment of the present invention.

FIG. 4 is a block diagram representing the system architecture 400 of an embodiment of the present invention. System 400 includes a coverage engine 402 and associated corporate general liability (CGL) database 404; a working engine 406 and associated balance sheet database 408; a risk engine 410 and associated standard industrial classification codes (SIC) database 412; a cash flow engine 414 and an associated income statement database 416; a maximum coverage engine 418; and a premium charge engine 420. Engines 402,406,410,414,418 and 420 are used to generate the limits, premiums and the like for an EPIC 422.

The coverage engine 402 is used to calculate the excess premium based on the amount of each type of coverage required for the entity. This determination can be based on known CGL information stored in CGL database 404. Such CGL insurance information may include limits and any sublimits, for example, products liability, advertising injury, and property damage or physical injury supplements. Also, the CGL database 404 can include information concerning the scope of coverage. For example, information on the scope of the CGL coverage itself or specialty policy information such as pollution policy limits, errors and omissions policy limits or employment practice liability limites which are typically excluded from CGL policies. Other ultrahazardous activity coverage limits can also be stored in CGL database 404. Additionally, workmen's compensation limits, commercial auto limits, and other policy limits such as general property policies, real and personal (e.g., building and contents limits), can be stored. Further, information about separate policy riders, such as inland marine policies, can also be stored in CGL database 404.

Rather than basing the coverage charged for the EPIC on individual types of coverage, an accurate coverage charge can be made based on the single highest type of coverage as a baseline. For example, the coverage engine 402 can determine the rate and amount of excess coverage, and multiply the rate and the amount to determine the premium. Information can be stored into CGL database 404 based on the declaration pages of existing policies and the like. Other techniques for determining the amount of insurance that the entity has and its scope of coverage will become evident for a person skilled in the relevant art without departing from the spirit and scope of the present invention.

The working capital engine 406 determines the amount of working capital required to reestablish the entity based on an fortuitous, liquidating event. The working capital engine 406 makes this determination based on information stored in the balance sheet database 408. Balance sheet database 408 can store information concerning the entity's total tangible assets (other than inventory) plus those tangible assets necessary to run the business. Additionally, balance sheet database 408 can store information concerning those intangibles that can be classified as collateral. Based on this information, the working capital engine 406 determines the estimated amount of working capital needed to reestablish the business entity. Alternatively, the working capital engine 406 can determine the marked to market tangible net worth of the entity to limit the cost of reestablishing the business. In other words, the marked to market tangible net worth is an upper limit of coverage. This coverage ceiling is imposed so as not to make it more attractive for the entity to simply go out of business rather than to maintain its business.

In the case of an equity owner whose share of the equity is so small to make restarting the business impractical, the working capital engine 406 determines an insurable amount from the investor's basis, the tangible book value per share and the cash value per share.

The risk engine 410 determines the risk classification of the entity. Risk classification can be determined in any variety of ways looking at the entity and deciding what risks are involved in its line of business. One approach is to determine the Standard Industrial Classification Code (SIC) or the North American Industrial Classification System Code (NAICS) for the entity. Both SIC and NAICS codes are government-sponsored classification systems. In the case of SIC, the system is sponsored by the U.S. government; it is being gradually replaced by NAICS, which is a NAFTA-sponsored system. The systems are widely used by government agencies like OSHA and the Census Bureau as well as by insurance carriers. Thus, in this embodiment, the risk engine 410 has associated therewith an SIC database 412. The SIC database 412 stores SIC classifications (i.e., risk classifications) for various types of businesses. Typically, SIC classifications are arranged in class codes. Class codes specify some given charge for each class per unit of coverage. In other words, rate is associated with each class code.

That rate is based on some nominal fraction of the CGL amount, typically some fraction per $1,000 of coverage.

Additionally, the risk engine 410 must determine the loss costs. The Insurance Services Office, Inc. (ISO), World Trade Center, New York, N.Y., maintains loss costs for each industrial (e.g., ISO lists the expected amounts to pay out in claim for each industrial classification). A rate is determined by multiplying the loss costs by a loss cost multiplier furnished in the database. Other risk calculations will become apparent to a person skilled in the relevant art without departing from the spirit and scope of the present invention.

The cash flow engine 414 determines the free cash flow of the entity. In an embodiment of the present invention, the cash flow engine 414 derives the free cash flow directly from an income statement database 416. Alternatively, an algorithm can be used to calculate the free cash flow. Such algorithms for free cash flow determination would be apparent to a person skilled in the relevant art.

The maximum coverage engine 418 determines a maximum level of coverage (B). This maximum level of coverage is based on, for example, the working capital required to reestablish the entity determined by the working capital engine 406 and the free cash flow of the entity determined by cash flow engine 414. The maximum coverage engine 418 may use additional information to determine the maximum level of coverage (B). In other words, the maximum coverage 418 can be programmed to determine "factors" on which to base the maximum level of coverage determination. For example, the maximum level of coverage should not be set higher than the total amount necessary for the entity to be reestablished. Alternatively, the maximum level of coverage should not be set higher than the marked to market tangible net worth. Nor should the maximum level of coverage be set higher than the working capital requirement. Alternatively, coverage should not be set higher than some multiple (e.g, 3 times) the value of the free cash flow so as not to make it attractive for an entity to engineer a loss.

The premium charge engine 420 determines a premium to charge for insurance in the amount (C) in excess of the primary insurance (A) for the risk classification determined by the risk engine 410. The premium charge is then used to create the EPIC 422. The premium charge engine 420 can include a look up table to determine the cost per unit of coverage on which to base the premium charge. An example look up table is shown in Table 1. Given the amount of coverage that has been determined, and a known toss cost for a given industrial classification (workmen's compensation (WC), commercial auto coverage (CA), general liability (GL) coverage or the like) the present charge engine 420 can readily isolate the premium charge to use for the EPIC 422. Table 1 is provided by way of example as a mechanism by which the premium charge engine 420 can make its determination. Rather than a look up table, algorithms, or the like, can be used to make this determination as would become apparent to a person skilled in the relevant art without departing from the spirit and scope of the present invention.

TABLE 1

| For 100 Units of Coverage ($) | WC | GL | CA | etc |
|---|---|---|---|---|
| 1000 | .05 | .22 | .02 | |
| 1100 | .05 | .21 | .02 | |
| 1200 | .05 | .20 | .02 | |

TABLE 1-continued

| For 100 Units of Coverage ($) | WC | GL | CA | etc |
|---|---|---|---|---|
| 1300 | .04 | .19 | .02 | |
| 1400 | .04 | .18 | .02 | |
| 1500 | .04 | .17 | .01 | |
| 1600 | .03 | .16 | .01 | |
| 1700 | .03 | .15 | .01 | |
| 1800 | .02 | .14 | .01 | |
| etc. | | | | |

The calculation of insurance policy maximum coverage is based on a minimum as follows:

$$C = \min(W, F, N) \quad (1)$$

where C is the maximum total amount of coverage, W is the estimated required working capital of the company, F is the free cash flow of the insured multiplied by a factor of 3, for example, and N is the marked to market net worth of the insured.

The calculation of insurance premium is as follows:

$$P = R^*(C - U) \quad (2)$$

where P is the premium charge, R is the rate that is looked up in a database table, with a discrete table for each risk class, amount (P) and amount of underlying insurance (U), and U is the amount of primary insurance of the owned entity.

The present invention can be used to simply provide more of the same insurance coverage based of the determinations described herein, or it can be used to "fill the gaps" in the original insurance, in which case the rates per unit of coverage would be higher. Alternatively, the premium can be based on a blended rate for to add more to existing insurance and to cover any gaps in the underlying policy.

IV. Put Option
A. EPIC for an Option to Put Stock

As noted in the Overview section, the present invention can also be formulated as an Option to Put Stock.

The mathematical calculation of a premium (D) for an Option to Put Stock is as follows:

$$D = E - S \quad (3)$$

where D is the Premium for the option, E is the same as the Facility Fee for a Letter of Credit, and S is the probable salvage value of the company calculated according to expected loss frequency and loss severity.

This calculation of an option to put stock begins by performing a credit analysis about the business and the probability of an fortuitous events causing the business to fail or otherwise cease to function. A financial services company can then determine a premium to charge the business's equity owner(s) to buy a put option on the business. Should some fortuitous event cause the business to fail or otherwise cease to function, the equity owner can exercise the put option and sell the business to the financial services company.

The following example illustrates how to determine an EPIC put option. Assuming, for example, the business has a yearly income stream of six hundred thousand dollars, the financial services company can sell a five hundred thousand put option to the equity owner with confidence that equity owner will not have a motive to drive the business into the ground in order to cash-in on the put option. Unless the business has gone broke in a legitimate way, it is more attractive for the equity owner to keep the business operating at six hundred thousand dollars a year than to throw it away for five hundred thousand dollars. A business person would not sell a six hundred thousand dollars a year cash flow for five hundred thousand dollars, which is the amount necessary to reestablish the business. A protection mechanism to prevent a secondary market for the put options is to simply make the option personal to the equity owner.

The put option is a contract for the potential sale of a security, and like a contract it can have covenants, representations and warranties. For example, a covenant could require the put option holder/customer to represent that its financial statements fairly reflect its financial condition in accordance with generally accepted accounting principles, consistently applied. Or the customer would covenant not to sell assets other than in the ordinary course of business. Alternatively, the customer would covenant not to incur indebtedness or create liens on its property not greater than a predetermined amount in the aggregate, and in any case, only in the ordinary course of business. Or the customer would covenant not to dividend funds to shareholders in excess of the lesser of some predetermined amount or percentage of net after-tax income. The customer would perhaps covenant not to make loans to its shareholders, officers, directors or employees in an amount greater than predetermined amount in aggregate. Another type of covenant may prevent the customer from engaging in any dealing with shareholders, officers, directors or employees that involves a conflict of interest without the written consent of the Company. Yet another limitation would be to prevent the customer from representing that it has the exclusive right to the use of its name, trademarks, customer lists or goodwill. Still yet another covenant would require that the customer maintain a predetermined debt to equity ratio of, a quick asset ratio, and/or a given net worth of. Also, the customer could be asked to warrantee that it has given full disclosure.

B. Overview of Derivatives

In today's financial markets, the use of financial instruments known as "derivatives" have exponentially grown and is now common place. A derivative is an investment vehicle whose value is based on the value of another security or underlying asset. That is, a derivative is essentially a financial instrument that is derived from the future movement of something that cannot be predicted with certainty. By the late 1990's the Office of the Comptroller of the Currency estimates that commercial banks in the United States alone, held over twenty trillion dollars worth of derivative-based assets. Common examples of derivatives include futures contracts, forward contracts, options, and swaps, all of which are briefly explained below.

Forward and futures contracts are standardized, transferable agreements, which may be exchange-traded, to buy or sell a commodity (e. g., a particular crop, livestock, oil, gas, etc.). These contracts typically involve an agreed-upon place and time in the future between two parties.

Options contracts are agreements, that may be exchange-traded, among two parties that represent the right to buy or sell a specified amount of an underlying security (e.g., a stock, bond, futures contract, etc.) at a specified price within a specified time. The parties of options contracts are purchasers who acquire "rights," and sellers who assume "obligations." Further, a "call" option contract is one giving the owner the right to buy, whereas a "put" option contract is one giving the owner the right to sell the underlying security. There is typically an up-front, non-refundable premium that the buyer pays the seller to obtain the option rights.

Swaps allow entities to exchange variable cash flows for fixed payments. They are similar to options but no premium (i.e., up-front money) is paid to obtain the rights. It is essentially an outright trade based on the expected movement of the price of the derivative's underlying commodity.

Derivatives are typically used by institutional investors to increase overall portfolio return or to hedge or revoke portfolio risks. Derivatives are also frequently used by banks, companies, organizations, and the like to protect against market risks in general. Derivatives help in managing risks by allowing such banks, companies, organizations, and the like to divide their risk into several pieces that may be passed off to other entities who are willing to shoulder the risk for an up-front fee or future payment stream.

Derivatives, being financial instruments, may be traded among investors as are stocks, bonds, and the like. Thus, in order to trade derivatives, there must be a mechanism to price them so that traders may exchange them in an open market.

The relationship between the value of a derivative and the underlying asset are not linear and can be very complex. Economists have developed pricing models in order to valuate certain types of derivatives. As is well known in the relevant art(s), the Black-Scholes option pricing model is the most influential and extensively used pricing model. The Black-Scholes model is based on stochastic calculus and is described in detail in a variety of publicly available documents, such as Chriss, Neil A., The Black-Scholes and Beyond Interactive Toolkit. A Step-by-Step Guide to In-depth Option Pricing Models, McGraw-Hill, 1997, ISBN: 078631026X (USA), which is incorporated herein by reference in its entirety.

Whether using the Black-Scholes or any other pricing model, each has inherent flaws and thus poses risks. It has been estimated that some 40% of losses in dealing with derivatives can be traced to problems related to pricing models.

Risks in relying on any model includes errors in the model's underlying assumptions, errors in calculation when using the model, and failure to account for variables (i e., occurrences) that may affect the underlying assets.

C. The Black-Scholes Pricing Model

Before detailing the operation of the put option embodiment of the present invention, it is important to detail the specifics of the Black-Scholes pricing model. It is noted that, for illustrative purposes only, the invention is described with reference to the Black-Scholes pricing model. However, the invention is not limited to this embodiment. Instead, embodiments of the invention utilize variations of the Black-Scholes pricing model discussed herein. Also, other embodiments of the invention utilize pricing models other than the Black-Scholes model. The following description applies to such other embodiments of the invention.

The Black-Scholes formula for determining the price of a call option, C, using the five parameters essential to the pricing of an option: (1) the strike price K; (2) the time to expiration t, (3) the underlying commodity price S; (4) the volatility of the commodity a ("sigma"); and (5) the prevailing interest rate r, is shown in equation (4):

$$C = S*N(d_1) - Ke^{-(rt)}*N(d_2) \qquad (4)$$

As will be apparent to one skilled in the relevant art(s), e is the exponential function—the inverse of the natural logarithm ln—that is equal to, up to four significant decimal places, 2.7183. The variables $d_1$ and $d_2$ within equation (4)

are expressed as shown in equations (5A) and (5B), respectively:

$$d_1 = \frac{\ln\left(\frac{S}{K}\right) + \left(r + \frac{\sigma^2}{2}\right)^t}{\sigma\sqrt{t}} \quad (5A)$$

$$d_2 = d_1 - \sigma\sqrt{t} \quad (5B)$$

The function "N()" is the standard normal distribution function, which, as is well known in the relevant art(s), may be accurately approximated for any value z using equation (6):

$$N(z) = 1 - \frac{1}{(\sqrt{2}*\pi)} * e^{-z^2/2} * (b1*k + b2*k^2 + b3*k^3) \quad (6)$$

Further, the variable k used in equation (6) is defined as shown in equation (7):

$$k = 1/(1+\alpha*z) \quad (7)$$

The values a, b1, b2, b3 are constants equal to {α=0.33267; b1 0.4361836; b2=−0.1201676; and b3=0.937298}.

Having presented the Black-Scholes formula for a call option, equation (8) describes the expression for the price P of a put option:

$$P = C - S + Ke^{-(rt)} \quad (8)$$

Having presented the Black-Scholes pricing model, the operation of the present invention and its application to pricing of put option-based EPIC financial instruments can now be explained. However, as indicated above, while the present invention is described in terms of adopting the Black-Scholes model to include risk considerations, it will be apparent to one skilled in the relevant art(s), that other pricing model may be so adopted.

As the put option embodiment of EPIC is intended essentially as a device to protect against fortuitous events, an estimate of the frequency and severity of fortuitous liability events can be incorporated into the assumed volatility.

V. Letter of Credit

As noted above, in another embodiment of the present invention, rather than receiving an indemnity payment or a purchase of the investment as protection, the present invention also can be formulated as a letter of credit. In this embodiment, the shareholder pays a very low premium in exchange for a letter of credit promising to lend the investor a predetermined amount that is calculated to be sufficient to re-establish an investor's business or start over in the same or similar line of work. This mechanism, however, may not be suitable for small investments in large companies. The calculation of Facility Fee (E) for a letter of credit is as follows:

$$E = P*\left(\frac{C-L}{L}\right) - \sum_{Ti}^{Tn} \text{if } [V(M-A) > 0, V(M-A), 0] + B \quad (9)$$

where:

E is the facility fee, $T_1$ is the actuarially likely first time period of the loan under the letter of credit, $T_x$ is the last time period of the loan under the letter of credit, V is the present value of the loan balances at times T1 . . . Tx, M is a market rate of interest for a loan to the customer, L is the largest loan amount approbable under conventional banking standards, A is the agreed rate of interest for a loan under the letter of credit, and B is a facility fee rate that would be traditionally charged to the customer by a bank for letter of credit that is not triggered by a fortuitous event.

VI. Environment

In one embodiment, the invention is directed toward one or more computer systems capable of carrying out the functionality described herein. In another embodiment, the invention is directed to a computer program product, which is discussed in more detail below.

The functions performed by the servers can comprise software (computer programs) running on one or more general purpose computers or on customized hardware. Alternatively, the combination of the software and hardware to accomplish the functions of the present invention can be conceptualized as a union of server controllers that each perform a discrete task, such as: determining an amount of primary insurance that the entity has, the scope of coverage of the primary insurance and its limits; determining an amount of working capital required to reestablish the entity; determining the investor's basis in the investment; determining the risk classification of the entity; determining a marked-to-market tangible net worth of the entity; determining a free cash flow of the entity; determining a maximum level of coverage; or determining a premium charge. One, two, or more of these discrete tasks can be performed by a single server or controller. That is, the tasks performed by a first server controller and a second server controller can be performed by a single server controller and still be within the spirit and scope of the present invention. Alternatively, the discrete tasks can be performed by any number of servers or controllers.

The present invention (i.e., system 400 or any "engine" part thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 500 is shown in FIG. 5. The computer system 500 includes one or more processors, such as processor 503. The processor 503 is connected to a communication bus 502. Various software embodiments are described in terms of this exemplary computer system. After reading this description, it will be apparent to a person skilled in the relevant art how to implement the invention using other computer systems and/or computer architectures.

Computer system 500 can include a display interface 504 that forwards graphics, text, and other data from the communication infrastructure 502 (or from a frame buffer not shown) for display on the display unit 530.

Computer system 500 also includes a main memory 505, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518, represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 500. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCM-CIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. This channel 526 carries signals 528 and may be implemented using wire or cable, fiber optics, a phone line, a cellular phone link, an RF link and other communications channels.

In this document, the term "computer program product" refers to removable storage units 518, 522, and signals 528. These computer program products are means for providing software to computer system 500. The invention is directed to such computer program products.

Computer programs (also called computer control logic) are stored in main memory 508, and/or secondary memory 510 and/or in computer program products. Computer programs may also be received via communications interface 524. Such computer programs, when executed, enable the computer system 500 to perform the features of the present invention as discussed herein. In particular, the computer programs, when executed, enable the processor 503 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 503, causes the processor 503 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VII. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. This is especially true in light of technology and terms within the relevant art(s) that may be later developed.

The present invention has been described above with the aid of functional building blocks illustrating the performance of specified functions and relationships thereof. The boundaries of these functional building blocks have been defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof Thus, the breadth and scope of the present invention should not be limited by any of the above-described exemplary embodiments, but should be defined only in accordance with the following claims and their equivalents.

What is claimed is:

1. A method for providing an investor with financial protection, in the form of an equity protection insurance policy, against a loss in value in an investment in a limited liability entity arising from an event against which the entity is inadequately insured, comprising the steps of:
   a. determining an amount of primary insurance that the entity has and scope of its coverage;
   b. determining one of
      i. an amount of working capital required to reestablish the entity, and
      ii. the investor's basis in the investment;
   c. determining the risk classification of the entity;
   d. determining the free cash flow of the entity;
   e. based on at least steps b and d, determining a maximum level of coverage; and
   f. determining a premium charge for a desired insurance amount in excess of the primary insurance and equal to or less than the maximum level of coverage for the risk classification determined in step c,
wherein the investor, not the entity, is insured under the policy.

2. A method for providing an investor with financial protection, in the form of an equity protection insurance policy, against a loss in value in an investment in a limited liability entity arising from an event against which the entity has not obtained insurance, comprising the steps of:
   a. determining one of
      i. an amount of working capital required to reestablish the entity, and
      ii. the investor's basis in the investment;
   b. determining a risk classification of the entity;
   c. determining the marked-to-market tangible net worth of the entity;
   d. determining the free cash flow of the entity;
   e. based on at least steps c and d, determining a maximum level of coverage; and
   f. determining a premium charge for a desired amount of insurance equal to or less than the smaller of the amount of working capital, the basis, or the maximum level of coverage for the risk classification determined in step b, wherein the investor, not the entity, is insured under the policy.

3. A method for providing an investor with financial protection, in the form of an equity protection insurance policy, against a loss in value in an investment in a limited liability entity arising from events against which the entity is inadequately insured, and/or events against which the entity has not obtained insurance, comprising the steps of:

a. determining an amount of primary insurance that the entity has, the scope of coverage of the primary insurance and its limits;

b. determining an amount of working capital required to reestablish the entity;

c. determining the investor's basis in the investment;

d. determining the risk classification of the entity;

e. determining a marked-to-market tangible net worth of the entity;

f. determining a free cash flow of the entity;

g. based on at least steps d and e, determining a maximum level of coverage, h. determining a first premium charge for insurance in an amount equal to or less than a smaller of the working capital, the basis, and the maximum level of coverage, in excess of primary insurance for the risk classification determined in step c on risks for which there is primary insurance; and i. determining a second premium charge for insurance in an amount equal to or less than a smaller of the working capital, the basis, and the maximum level of coverage on risks for which there is no insurance, wherein the investor, not the entity, is insured under the policy.

4. A method for providing an investor with financial protection, in the form of an equity protection option, against a loss in value in an investment in a limited liability entity arising from an event against which the entity is inadequately insured, comprising the steps of:

a. determining an amount of primary insurance that the entity has, the scope of coverage of the primary insurance and its limits;

b. determining an amount of working capital required to reestablish the entity;

c. determining the investor's basis in the investment;

d. determining the risk classification of the entity;

e. determining a marked-to-market tangible net worth of the entity;

f. determining the free cash flow of the entity;

g. based on at least steps d and e, determining the maximum level of coverage;

h. determining an amount (D) equal to or less than the smaller of the working capital, the basis, and the maximum level of coverage; and i. determining consideration for an option to put the investor's equity in the investment for the amount D, calculated according to:

i. an amount for risks in excess of the primary insurance for the risk classification determined in step c, and ii. an amount for risks for which there is no insurance, wherein the option belongs to the investor, not the entity.

5. The method according to claim 4, further comprising the step of, in exchange for the financial protection, requiring the investor to represent that its financial statements fairly reflect its financial condition in accordance with generally accepted accounting principles.

6. The method according to claim 4, further comprising the step of, in exchange for the financial protection, requiring the investor not to sell assets other than in the ordinary course of business.

7. The method according to claim 4, further comprising the step of, in exchange for the financial protection, requiring the investor not to incur indebtedness or create liens on its property not greater than a predetermined amount in-the aggregate, and in any case, only in the ordinary course of business.

8. The method according to claim 4, further comprising the step of, in exchange for the financial protection, requiring the investor not to dividend funds to shareholders in excess of the lesser of some predetermined amount or percentage of net after-tax income.

9. The method according to claim 4, further comprising the step of, in exchange for the financial protection, requiring the investor not to make loans to its shareholders, officers, directors or employees in an amount greater than a predetermined amount in aggregate.

10. The method according to claim 4, further comprising the step of, in exchange for the financial protection, preventing the investor from engaging in any dealing with shareholders, officers, directors or employees that involves a conflict of interest without the written consent of the entity.

11. The method according to claim 4, further comprising the step of, in exchange for the financial protection, requiring that the investor refrain from representing that it has the exclusive right to the use of its name, trademarks, customer lists or goodwill.

12. The method according to claim 4, further comprising the step of, in exchange for the financial protection, requiring the investor to maintain a predetermined debt to equity ratio of, a quick asset ratio, and/or a given net worth of.

13. The method according to claim 4, further comprising the step of, in exchange for the financial protection, requiring the investor to warrantee that it has given full disclosure.

14. A system for providing an investor with financial protection, in the form of an equity protection insurance policy, against a loss in value in an investment in a limited liability entity arising from an event against which the entity is inadequately insured, comprising:

first means for determining an amount of primary insurance that the entity has and scope of its coverage;

second means for determining one of
i. an amount of working capital required to reestablish the entity, and
ii. the investor's basis in the investment;

third means for determining the risk classification of the entity;

fourth means for determining the free cash flow of the entity;

fifth means for determining a maximum level of coverage, based on at least the results of said second and said fourth determining means; and sixth means for determining a premium charge for a desired insurance amount in excess of the primary insurance and equal to or less than the maximum level of coverage for the risk classification determined by said third determining means, wherein the investor, not the entity, is insured under the policy.

15. A system for providing an investor with financial protection, in the form of an equity protection insurance policy, against a loss in value in an investment in a limited liability entity arising from an event against which the entity has not obtained insurance, comprising:

first means for determining one of
i. an amount of working capital required to reestablish the entity, and
ii. the investor's basis in the investment;

second means for determining the risk classification of the entity;

third means for determining the marked-to-market tangible net worth of the entity;

fourth means for determining the free cash flow of the entity;

fifth means for determining a maximum level of coverage, based on at least the results of said third and said fourth determining means; and sixth means for determining a premium charge for a desired amount of insurance equal to or less than the smaller of the amount of working capital, the basis, or the maximum level of coverage for the risk classification determined by said second means, wherein the investor, not the entity, is insured under the policy.

16. A system for providing an investor with financial protection, in the form of an equity protection insurance policy, against a loss in value in an investment in a limited liability entity arising from events against which the entity is inadequately insured, and/or events against which the entity has not obtained insurance, comprising:

first means for determining an amount of primary insurance that the entity has, the scope of coverage of the primary insurance and its limits;

second means for determining an amount of working capital required to reestablish the entity;

third means for determining the investor's basis in the investment;

fourth means for determining the risk classification of the entity;

fifth means for determining a marked-to-market tangible net worth of the entity;

sixth means for determining a free cash flow of the entity;

seventh means for determining a maximum level of coverage, based on at least the results of said fourth and said fifth determining means;

eighth means for determining a first premium charge for insurance in an amount equal to or less than a smaller of the working capital, the basis, and the maximum level of coverage, in excess of primary insurance for the risk classification determined in step c on risks for which there is primary insurance; and ninth means for determining a second premium charge for insurance in an amount equal to or less than a smaller of the working capital, the basis, and the maximum level of coverage on risks for which there is no insurance, wherein the investor, not the entity, is insured under the policy.

17. A computer program product comprising a computer useable medium having control logic stored therein for causing a computer to provide an investor with financial protection, in the form of an equity protection insurance policy, against a loss in value in an investment in a limited liability entity arising from an event against which the entity is inadequately insured, the computer control logic comprising:

first computer readable program code means for causing the computer to determine an amount of primary insurance that the entity has and scope of its coverage;

second computer readable program code means for causing the computer to determine one of
i. an amount of working capital required to reestablish the entity, and
ii. the investor's basis in the investment;

third computer readable program code means for causing the computer to determine the risk classification of the entity;

fourth computer readable program code means for causing the computer to determine the free cash flow of the entity;

fifth computer readable program code means for causing the computer to determine a maximum level of coverage, based on at least the results of said second and said fourth enabling means; and sixth computer readable program code means for causing the computer to determine a premium charge for a desired insurance amount in excess of the primary insurance and equal to or less than the maximum level of coverage for the risk classification determined by said third enabling means, wherein the investor, not the entity, is insured under the policy.

18. A computer program product comprising a computer useable medium having control logic stored therein for causing a computer to provide an investor with financial protection, in the form of an equity protection insurance policy, against a loss in value in an investment in a limited liability entity arising from an event against which the entity has not obtained insurance, the computer control logic comprising:

first computer readable program code means for causing the computer to determine one of
i. an amount of working capital required to reestablish the entity, and
ii. the investor's basis in the investment;

second computer readable program code means for causing the computer to determine the risk classification of the entity;

third computer readable program code means for causing the computer to determine the marked-to-market tangible net worth of the entity;

fourth computer readable program code means for causing the computer to determine the free cash flow of the entity;

fifth computer readable program code means for causing the computer to determine a maximum level of coverage, based on at least the results of said third and said fourth computer readable program code means; and sixth computer readable program code means for causing the computer to determine a premium charge for a desired amount of insurance equal to or less than the smaller of the amount of working capital, the basis, or the maximum level of coverage for the risk classification determined by said second computer readable program code means, wherein the investor, not the entity, is insured under the policy.

19. A computer program product comprising a computer useable medium having control logic stored therein for causing a computer to provide an investor with financial protection, in the form of an equity protection insurance policy, against a loss in value in an investment in a limited liability entity arising from events against which the entity is inadequately insured, and/or events against which the entity has not obtained insurance, comprising:

first computer readable program code means for causing the computer to determine an amount of primary insurance that the entity has, the scope of coverage of the primary insurance and its limits;

second computer readable program code means for causing the computer to determine an amount of working capital required to reestablish the entity;

third computer readable program code means for causing the computer to determine the investor's basis in the investment;

fourth computer readable program code means for causing the computer to determine the risk classification of the entity;

fifth computer readable program code means for causing the computer to determine a marked-to-market tangible net worth of the entity;

sixth computer readable program code means for causing the computer to determine a free cash flow of the entity;

seventh computer readable program code means for causing the computer to determine a maximum level of coverage, based on at least the results of said fourth and said fifth computer readable program code means;

eighth computer readable program code means for causing the computer to determine a first premium charge for insurance in an amount equal to or less than a smaller of the working capital, the basis, and the maximum level of coverage, in excess of primary insurance for the risk classification determined by said fourth computer readable program code means on risks for which there is primary insurance; and ninth computer readable program code means for causing the computer to determine a second premium charge for insurance in an amount equal to or less than a smaller of the working capital, the basis, and the maximum level of coverage on risks for which there is no insurance, wherein the investor, not the entity, is insured under the policy.

* * * * *